(12) United States Patent
Silvester

(10) Patent No.: US 6,842,696 B2
(45) Date of Patent: Jan. 11, 2005

(54) METHOD AND DEVICE FOR LOCATION DETECTION FOR A SCHEDULING PROGRAM

(75) Inventor: Kelan C. Silvester, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/187,651

(22) Filed: Jul. 1, 2002

(65) Prior Publication Data

US 2004/0002813 A1 Jan. 1, 2004

(51) Int. Cl.$^7$ .......................... G06F 17/00; G01C 21/00
(52) U.S. Cl. ..................... 701/213; 701/209; 340/988; 340/995.1; 340/995.24
(58) Field of Search ............................. 701/200, 201, 701/207, 208, 211, 212, 214, 213, 209; 340/988, 990, 995.1, 995.18, 995.24, 995

(56) References Cited

U.S. PATENT DOCUMENTS

| | | | | |
|---|---|---|---|---|
| 5,506,774 A | * | 4/1996 | Nobe et al. ................. | 701/213 |
| 5,654,908 A | * | 8/1997 | Yokoyama ................... | 708/109 |
| 5,680,312 A | * | 10/1997 | Oshizawa et al. .......... | 701/202 |
| 5,825,306 A | * | 10/1998 | Hiyokawa et al. .......... | 340/988 |
| 5,938,721 A | * | 8/1999 | Dussell et al. .............. | 701/211 |
| 5,941,930 A | * | 8/1999 | Morimoto et al. .......... | 701/201 |
| 5,987,375 A | * | 11/1999 | Tamai ......................... | 701/200 |
| 6,088,649 A | * | 7/2000 | Kadaba et al. .............. | 701/201 |
| 6,249,742 B1 | * | 6/2001 | Friederich et al. .......... | 701/202 |
| 6,411,899 B2 | * | 6/2002 | Dussell et al. .............. | 701/211 |
| 6,470,268 B1 | * | 10/2002 | Ashcraft et al. ............ | 701/209 |

\* cited by examiner

Primary Examiner—Michael J. Zanelli
Assistant Examiner—Eric M. Gibson
(74) Attorney, Agent, or Firm—Blakely, Sokoloff, Taylor & Zafman LLP (57) ABSTRACT

A method and device are provided to determine a location corresponding to an entry in a database stored in an electronic device; determine a current position of the electronic device; obtain navigational information from the current position to the location; and provide the navigational information to a user.

27 Claims, 6 Drawing Sheets

METHOD AND DEVICE FOR LOCATION DETECTION FOR A SCHEDULING PROGRAM

FIELD

Embodiments of the invention relate to finding directions for appointments, tasks, meetings, etc. entered in an electronic database.

BACKGROUND

Programs such as Microsoft Outlook or Lotus Notes are used to manage events such as appointments, meetings, to do lists etc. While these programs are extremely popular and convenient to use, a user still has to get directions to a location at which an event is to occur. This may be done by using a physical map book or by using an electronic map database. When using an electronic map database the user has to provide an address of a location at which an event is to occur. This results in the user having to enter the address twice, i.e. once in the scheduling program and once in a query to the electronic map database. To some extent having to enter address information detracts from the convenience and utility of such programs.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, for purposes of explanation, numerous specific details are set forth. However, it is to be understood that embodiments of the invention may be practiced without the specific details. In other instances, well known circuits, structures and techniques have not been shown in detail in order not to obscure the understanding of this description.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
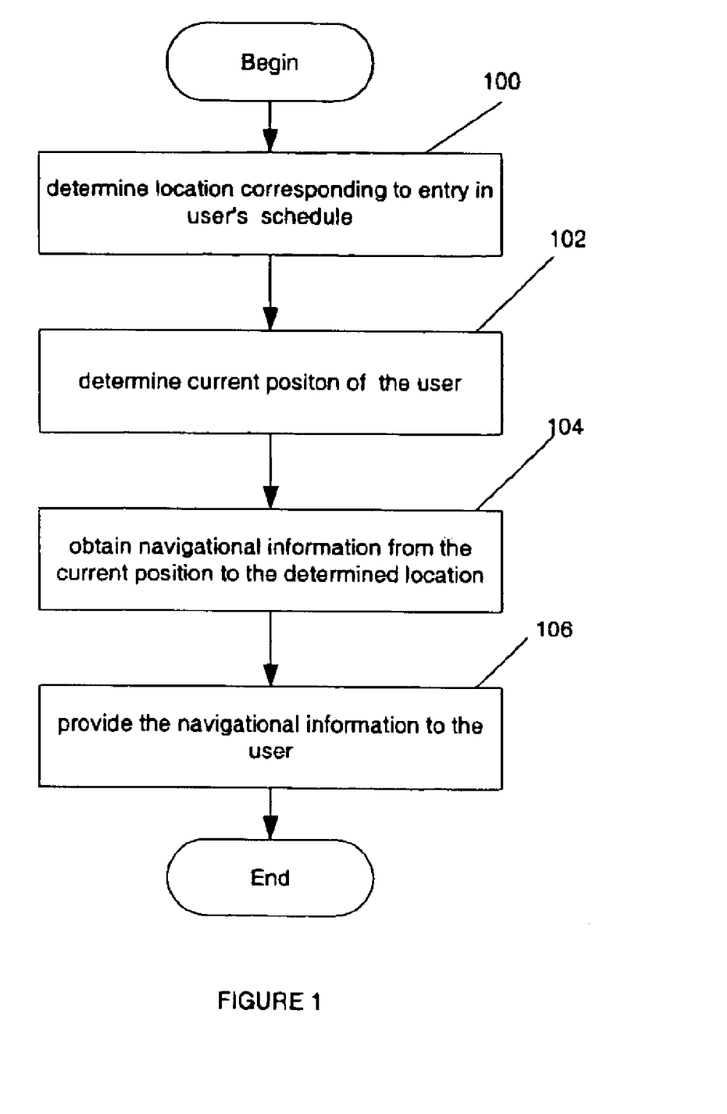
FIG. 1 shows a flowchart of operations performed in accordance with one embodiment of the invention.

In one embodiment, the invention provides a method for obtaining navigational information to a next-scheduled event in a user's schedule as illustrated in FIG. 1 of the drawings. Referring to FIG. 1, at block 100 a system 400, which is further described with reference to FIG. 4 of the drawings, determines a location corresponding to an entry in the user's schedule. According to embodiments of the invention, the user's schedule is maintained using a commercially available scheduling program such as Lotus Notes or Microsoft Outlook. In other embodiments, the scheduling program may be a custom-written scheduling program. The entry may be a next-scheduled event in the user's schedule such as an appointment or a meeting. In other embodiments, the entries may be a next-scheduled task such as a "to do" item in a task list associated with the user's scheduling program.

Figure 2A:
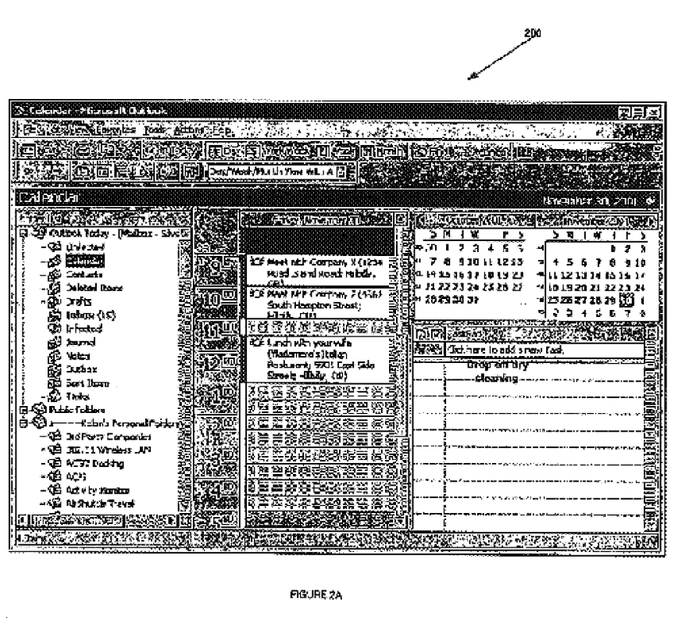
FIGS. 2A and 2B shows screenshots of a user's schedule.

Example entries are provided in FIG. 2A of the drawings which shows a screen shot 200 of a user's schedule entered in Microsoft Outlook. Referring to the screen shot 200, it will be seen that the user has three scheduled events, viz. (1) namely a meeting at 9:00 a.m. with Company X at 1234 Road Island Road, Hillbilly, Oreg., (2) a meeting at 10:00 a.m. with Company Z at 4567 South Hampton Street, Hillbilly, Oreg., and (3) a lunch date at Vladamere's Italian Restaurant, 9901 East Side Street, Hillbilly, Oreg. Further, screen shot 200 shows that the user has entered a task in a "Task Pad" indicating that the user has to drop off dry cleaning.

Determining the location at block 100 includes searching an address database for an address corresponding to a name in the entry. The name may be a company name or a name of a person. For example, in the case of the 9:00 a.m. appointment, the address database will be searched for an address corresponding to Company X.

In other embodiments, determining the location comprises determining if the entry includes a task indicating a location at which the task can be performed. For example, assuming that the user's schedule corresponds to the screen shot 200, determining the location comprises determining if the entry "drop off dry cleaning" indicates a location at which the task (in this case dry cleaning) can be performed. This is done by mapping key words to tasks that can be performed at defined locations. Examples of keyword-to-location mappings include mapping "buy flowers" to the location "florist", mapping "deposit check" to the locations automatic teller machine (ATM) or bank, mapping "dry cleaning" to the location dry cleaner, etc. Once the mapping has been established, then determining if the entry includes a task indicating a location at which the task can be performed comprises searching the entry for key words from the list.

At block 102, system 400 determines a current position of the user. In one embodiment, system 400 comprises GPS hardware to enable the system to receive a GPS signal and to calculate the current position of the system/user based on the GPS signal.

It is to be appreciated that other types of hardware may be used to determine the current position. Further, system 400 may determine the current position by making assumptions based on, for example, a calendar entry. For example, system 400 can assume, for the entries shown in FIG. 2A, that from 9–10am, the user is located at 1234 Road Island Road. For calendar entries where a location is not specified, the user could enter a default location such as the address of his office between the hours of 9am to 5pm, and his home address during other hours.

At block 104, system 400 obtains navigational information to the determined location based on the current position. In the case of the determined location corresponding to an address such as is the case with the 9:00 a.m. appointment shown in screen shot 200, obtaining the navigational information comprises searching a map database for a route, which could include driving directions from the user's current position to the address of the location.

In the case of the location being a "location," such as a bank, a florist, a dry cleaner, etc., where a task may be performed, then obtaining the navigational information at block 104 includes searching a map database for the location. In some embodiments, more than one choice of a location at which a task may be performed is presented to the user, e.g. within a drop-down list, so that the user may select a desired location. In this case, obtaining the navigational information then comprises obtaining a route, e.g. driving directions, to the determined or selected place location on the user's current position.

Figure 2B:
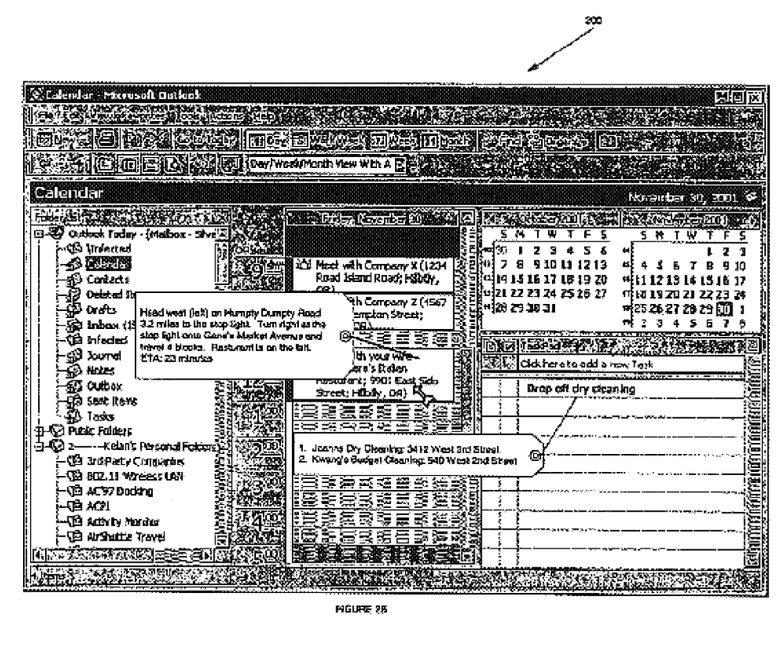

At block 106, system 400 provides the navigational information e.g. by displaying it to the user. In one embodiment, this may be done in response to user-input indicating that the navigational information is required. In one embodiment, a macro or intelligent hot-key is provided so that when a user positions a cursor over the entry in the user's schedule the navigational information associated with the entry is automatically displayed. This is illustrated in FIG. 2B of the drawings where navigational information associated with the 12:00 p.m. entry in the user's schedule is automatically displayed when a cursor is positioned over the 12:00 a.m. entry. FIG. 2B of the drawings also illustrates the embodiment described above in which a list of determined locations at which a task may be performed is displayed to the user for selection of a preferred location.

Figure 3A:
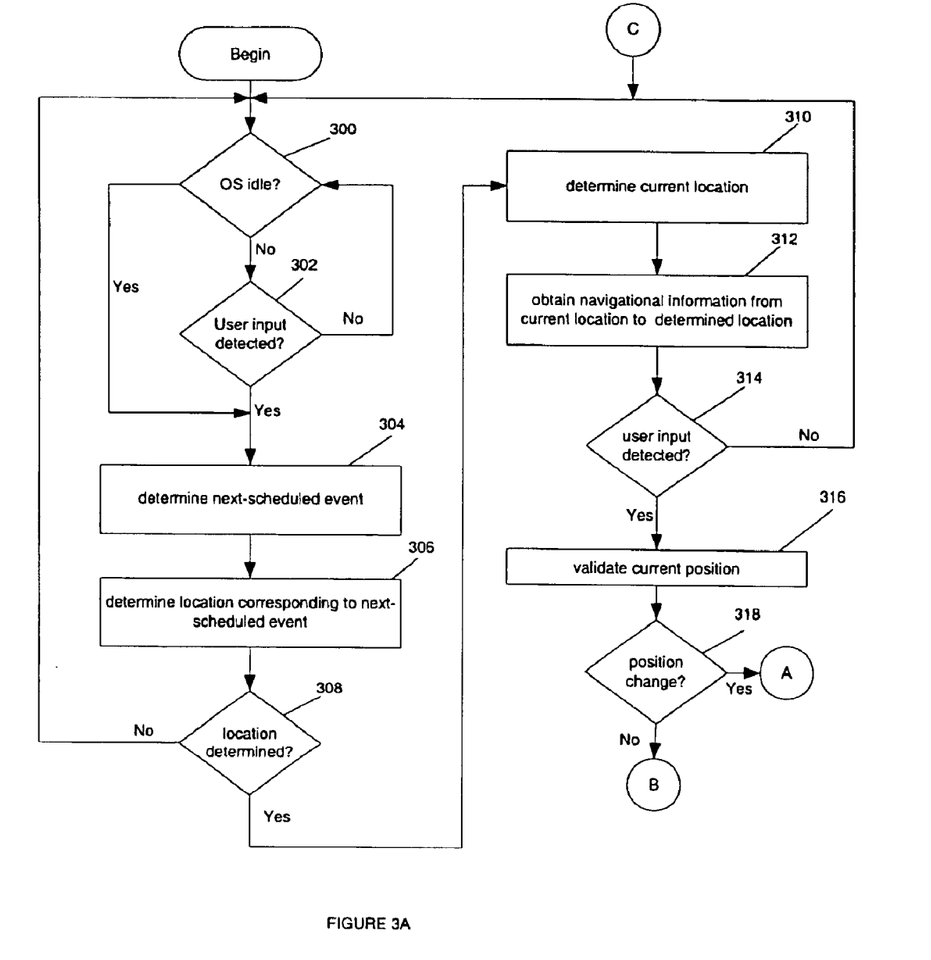
FIGS. 3A and 3B shows a flowchart of operations performed in accordance with another embodiment of the invention.
Figure 3B:
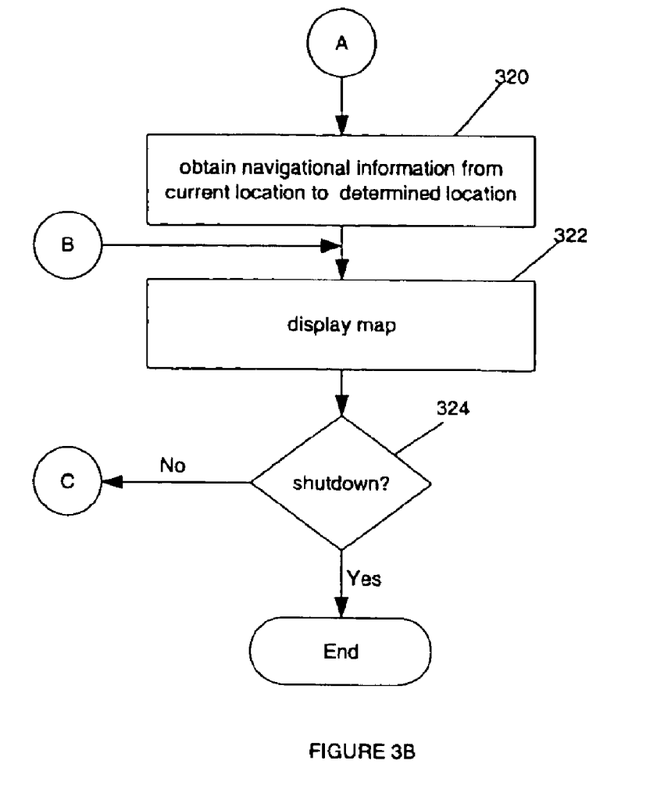

Referring to FIGS. 3A and 3B of drawings, another embodiment of a technique for providing navigational information to a user based on an entry in the user's schedule is provided. The method illustrated in FIGS. 3A and 3B of the drawings is typically performed by a system 400 which is described later with reference to FIG. 4 of the drawings.

Starting at block 300, system 400 determines whether an operating system for the system is idle. The method illustrated in FIGS. 3A and 3B, follows a closed-lid computing model wherein the operations forming part of the method are performed when the operating system is idle. In this way system resources such as battery power may be conserved. Use of the term "closed-lid computing model" herein denotes a computing model wherein operations are performed or threads executed when a system has entered a "sleep" state in order to conserve battery power. For example, in the case of a notebook computer a sleep state is entered when a user closes the lid of the notebook computer. Under the "closed-lid computing model", although the notebook computer has entered a low power sleep state, it is able to continue operation and process data. Thus, the operation shown in FIGS. 3A and 3B of the drawings may be performed, in one embodiment, when the notebook computer has entered such a sleep state.

If the operating system is not idle then block 304 executes, otherwise block 302 executes wherein a check is performed to determine if user-input has been detected. If at 302, no user-input has been detected then control passes to block 300, otherwise block 304 executes.

At block 304, system 400 determines the next-scheduled event in a user's schedule. This is done by analyzing a user's schedule which may, according to embodiments of the invention, be a schedule entered into a commercial scheduling program such at Lotus Notes or Microsoft Outlook. The next-scheduled event may be an event such as a meeting or appointment entered in a calendar or a task entered in a "to do" list as described above.

At block 306, system 400 determines a location corresponding to the next-scheduled event. Block 306 is similar to block 100 in FIG. 1 and is not further described. At block 308, system 400 checks if a location has been determined at block 306. If no location has been determined then control passes to block 300 otherwise block 310 executes. Block 310 comprises determining the current location and is similar to block 102 in FIG. 1 and is therefore not further described.

At block 312, system 400 obtains navigational information to the determined location based on the current location. The execution details of block 312 is similar to that of block 104 in FIG. 1 of the drawings and is not further described. At block 314, system 400 checks if user-input has been detected. If no input has been detected then control passes to block 300. If user-input has been detected then block 316 executes wherein system 400 validates the current position of the user. This is done, in one embodiment, by using the GPS hardware to recalculate the position of the user and to compare it to the current location determined at block 310 to determine if there has been a change in the current position.

At block 318, if a change has been detected then block 320 executes wherein navigational information from the latest current position to the determined location is obtained in a manner similar to block 312. After execution of block 320, or 318 if no change has been detected at block 318, then block 322 executes wherein the navigational information is displayed to the user. If a shutdown message has been detected at block 324 then the process ends otherwise control is passed to block 300.

Figure 4:
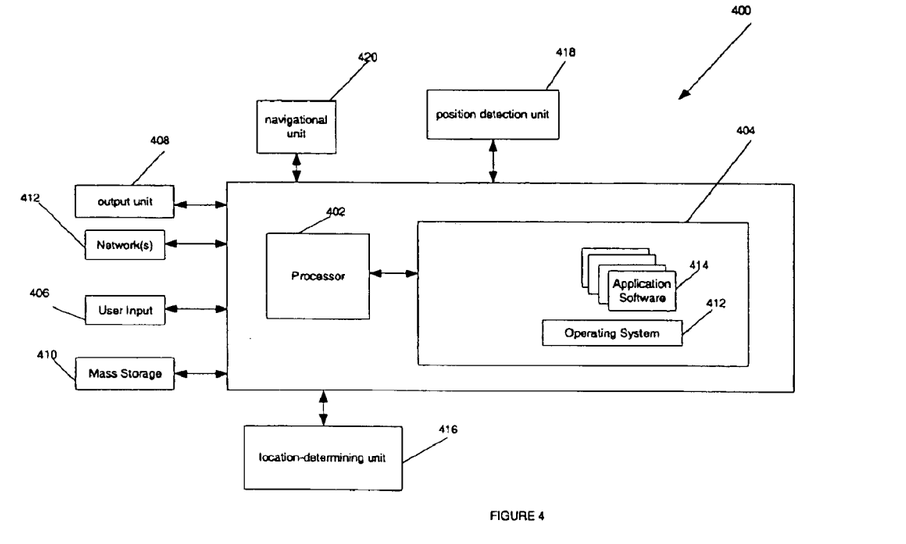
FIG. 4 is a block diagram of a computer system in accordance with one embodiment of the invention.

FIG. 4 illustrates a system in accordance with one embodiment of the invention. For the purposes of the invention, device 400 may represent practically any type of computer, computer system or other programmable electronic device, including a client computer, Personal Digital Assistant (PDA), Personal Information Manager (PIM), cellular telephone, etc. Device 400 will hereinafter also be referred to as a "computer" although it should be appreciated that the term "computer" may include other suitable programmable electronic devices consistent with the invention.

Computer 400 typically includes at least one processor 402 coupled to a memory 404. Processor 402 may represent one or more processors (e.g. microprocessors), and memory 404 may represent random access memory (RAM) devices comprising a main storage of computer 400, as well as any supplemental levels of memory, e.g., cache memories, non-volatile or back-up memories (e.g. programmable flash memories), read-only memories, etc. In addition, memory 404 may be considered to include memory storage physically located elsewhere in computer 400 e.g. any cache memory in a processor 402, as well as any storage capacity used as a virtual memory, e.g. as stored on a mass storage device 410 or on another computer coupled to computer 400 via a network 412.

Computer 400 also typically receives a number of inputs and outputs for communicating information externally. For interface with a user or operator, computer 400 typically includes one or more user-input devices 406 (e.g. a keyboard, a mouse, a trackball, a microphone, etc.) and an output unit or display 408 (e.g. an LCD display panel).

For additional storage, computer 400 may also include one or more mass storage devices 410 e.g. a floppy or other removable disk drive, a hard disk drive, a direct access storage device (DASD), an optical drive (e.g. a CD drive, a DVD drive, etc.), and/or a tape drive, among others. Furthermore, computer 400 may include an interface with one or more networks 412 (e.g. a LAN, WAN, a wireless network, and/or the Internet among others) to permit the communication of information with other computers coupled to the network. It should be appreciated that computer 400 typically includes suitable analog and/or digital interfaces between processor 402 and each of the components 404, 406, 408, 410 and 412 as is well known in the art.

Computer 400 includes a location-determining unit 416, a positioned detection unit 418, and a navigational unit 420. The location-determining unit 416 determines the location associated with an entry in a user's schedule in accordance with the techniques described above. The position detection unit 418 detects a current position of the user in accordance with the techniques described above. In one embodiment, position detection unit 418 includes Global Positioning System (GPS) hardware. The navigational unit 420 determines the navigational information from the current position through the determined location in accordance with the techniques described above. Components of location-determining unit 416, position detection unit 418 and navigational unit 420 may be implemented in software and/or in hardware. Further, in one embodiment, location-detection determining unit 416, positioning detection 418, and navigational unit 420 may be integrated onto a single add-on card.

Computer 400 operates under the control of an operating system 412, and executes various computer software applications, components, programs, objects, modules, etc. (e.g. application software 414 such as a scheduling program described above).

Although embodiments of the invention have been described with reference to scheduling programs and programs with task or to-do lists, the invention has utility with any program that has entries with address information stored in a database.

In general, the routines executed to implement the embodiments of the invention, where implemented as part of an operating system or a specific application component, program, object, module or sequence of instructions are referred to herein as "computer programs", or simply "programs". The computer programs typically comprise one or more instructions that are resident at various times in various memory and storage devices in a computer, and that when read and executed by one or more processors in computer, cause that computer to perform the steps necessary to execute steps or elements embodying the various aspects of the invention. Moreover, while the invention has and hereinafter will be described in the context of fully functioning computers and computer systems, those skilled in the art will appreciate the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD ROMS, DVDs, etc.) among others, and transmission type media as digital and analog communication links.

In addition, various programs described herein may be identified based upon the application for which they are implemented in a specific embodiment of the invention. However, it should be appreciated that any particular program nomenclature used herein is merely for convenience, and thus the invention should not be limited to uses solely in any specific application identified and/or implied by such nomenclature.

Further, those skilled in the art will recognize that the exemplary computer shown in FIG. 4 of the drawings is not intended to limit the present invention. Indeed, those skilled in the art will recognize that other alternative hardware and/or software environments may be used without departing from the scope of the present invention.

For the purposes of this specification, a computer-readable medium includes any mechanism that provides (i.e. stores and/or transmits) information in a form readable by a machine (e.g. computer) for example, a computer-readable medium includes read-only memory (ROM); random access memory (RAM); magnetic disk storage media; optical storage media; flash memory devices; electrical, optical, acoustical or other form of propagated signals (e.g. carrier waves, infra red signals, digital signals, etc.); etc.

It will be apparent from this description the aspects of the present invention may be embodied, at least partly, in software. In other embodiments, hardware circuitry may be used in combination with software instructions to implement the present invention. Thus, the embodiments of the invention are not limited to any specific combination of hardware circuitry and software.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method comprising:
    determining a location corresponding to an entry in a database stored in an electronic device, wherein determining the location is performed upon detection of an idle state of an operating system for the electronic device;
    determining a current position of the electronic device;
    obtaining navigational information from the current position to the location; and
    providing the navigational information to a user.

2. The method of claim 1, wherein the database comprises an address database; and determining the location comprises searching the address database for an address corresponding to a name in the entry.

3. The method of claim 1, wherein determining the location comprises determining if the entry includes a task indicating a location at which the task can be performed.

4. The method of claim 3, further comprising mapping key words to tasks that can be performed at defined locations.

5. The method of claim 4, wherein determining if the entry includes a task indicating a location at which the task can be performed comprises searching the entry for a keyword from the list.

6. The method of claim 1, wherein determining the current position comprises receiving a Global Positioning Satellite (GPS) signal; and calculating the current position based on the Global Positioning Satellite (GPS) signal.

7. The method of claim 1, wherein determining the current position comprises selecting a current position based on assumed locations or a list of default locations.

8. The method of claim 1, wherein obtaining the navigational information comprises querying a map database for the navigational information.

9. The method of claim 1, wherein the database comprises a schedule and the entry is a next-scheduled entry in the schedule.

10. A device comprising:
- a location-determining unit to determine a location associated with an entry in a database, upon detection of an idle state of an operating system for the device;
- a position detection unit to detect a current position of the device;
- a navigational unit to determine navigational information from the current position to the location; and
- an output unit to output the navigational information to a person.

11. The device of claim 10, further comprising a connection mechanism to connect the device to a host computer system.

12. The device of claim 10, wherein the database comprises a schedule and the entry is a next-scheduled entry in the schedule.

13. The device of claim 10, wherein the entry comprises a name, and the location-determining unit determines the location by searching an address database for a location corresponding to the name.

14. The device of claim 10, wherein the location-determining unit comprises a list of keywords corresponding to locations at which defined tasks can be performed.

15. The device of claim 10, wherein the entry comprises a task, and the location-determining unit determines the location by searching the entry for words that match keywords in the list.

16. The device of claim 10, wherein the position detection unit detects the current position by receiving a Global Positioning Satellite (GPS) signal; and calculating the current position based on the Global Positioning Satellite (GPS) signal.

17. The device of claim 10, wherein the navigational unit determines the navigational information by querying a map database for the navigational information.

18. The device of claim 10, wherein the map database is stored on a remote computer.

19. Apparatus comprising:
- a processing system; and
- a memory coupled to the processing system, the memory storing instructions which when executed by the processing system cause the processing system to perform a method comprising:
- determining a location corresponding to an entry in a database stored in an electronic device, wherein determining the location is performed upon detection of an idle state of an operating system for the processing system;
- determining a current position of the electronic device;
- obtaining navigational information to the location from the current position; and
- providing the navigational information to a user.

20. The system of claim 19, wherein the database comprises an address database and determining the location comprises searching the address database for an address corresponding to a name in the entry.

21. The system of claim 19, wherein determining the location comprises identifying a word in the entry that indicates a location at which a task in the entry can be performed; and searching a map database for an address corresponding to the word.

22. A computer-readable medium having stored thereon a sequence of instructions which when executed by a processing system, cause the processing system to perform a method comprising:
- determining a location corresponding to an entry in a user's schedule, wherein determining the location is performed upon detection of an idle state of an operating system for the processing system;
- determining a current position of the electronic device;
- obtaining navigational information to the location from the current position; and
- providing the navigational information to a user.

23. The computer-readable medium of claim 22, wherein the database comprises an address database and determining the location comprises searching an address database for an address corresponding to a name in the entry.

24. The computer-readable medium of claim 22, wherein determining the location comprises determining if the entry includes a task; and searching a map database for an address corresponding to a location at which the task can be performed.

25. An electronic device comprising:
- means for determining a location associated with an entry in a database stored in the electronic device, upon detection of an idle state of an operating system for the electronic device;
- means for detecting a current position of the electronic device;
- means for determining navigational information from the current position to the location; and
- means for outputting the navigational information to a user.

26. The device of claim 25, further comprising means for connecting the device to a host computer system.

27. The device of claim 25, further comprising means for obtaining the schedule.

* * * * *